United States Patent
Suzuki

(10) Patent No.: US 7,490,687 B2
(45) Date of Patent: Feb. 17, 2009

(54) CONTROL METHOD FOR TRANSMISSION FOR MOTORCYCLE

(75) Inventor: Osamu Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 180 days.

(21) Appl. No.: 11/705,440

(22) Filed: Feb. 13, 2007

(65) Prior Publication Data
US 2007/0186705 A1 Aug. 16, 2007

(30) Foreign Application Priority Data
Feb. 14, 2006 (JP) .............................. 2006-035922

(51) Int. Cl.
*B62K 11/00* (2006.01)

(52) U.S. Cl. ....................... 180/219; 180/218; 180/282; 701/55

(58) Field of Classification Search ................. 180/219, 180/218, 282; 701/55
See application file for complete search history.

(56) References Cited

U.S. PATENT DOCUMENTS

| | | | |
|---|---|---|---|
| 6,471,619 B2 * | 10/2002 | Nanri et al. | 477/52 |
| 6,527,077 B2 * | 3/2003 | Yamamoto et al. | 180/283 |
| 7,017,701 B2 * | 3/2006 | Flynn et al. | 180/282 |
| 2004/0050609 A1 * | 3/2004 | Machida et al. | 180/282 |
| 2004/0162654 A1 * | 8/2004 | Lu et al. | 701/38 |
| 2006/0054375 A1 * | 3/2006 | Kakinuma | 180/282 |
| 2007/0045028 A1 * | 3/2007 | Yamamoto et al. | 180/282 |
| 2007/0222575 A1 * | 9/2007 | Kawashima | 340/476 |
| 2008/0099266 A1 * | 5/2008 | Hiroi et al. | 180/219 |
| 2008/0103663 A1 * | 5/2008 | Hiroi | 701/54 |
| 2008/0177451 A1 * | 7/2008 | Saitou et al. | 701/55 |

FOREIGN PATENT DOCUMENTS

JP 2002-67741 A 3/2002

* cited by examiner

*Primary Examiner*—Paul N Dickson
*Assistant Examiner*—Tashiana Adams
(74) *Attorney, Agent, or Firm*—Birch, Stewart, Kolasch & Birch, LLP

(57) ABSTRACT

A control method for a transmission for a motorcycle having a plurality of shift gear trains such that the combination of gears meshing with each other is changed by driving an actuator to change a shift position. When a vehicle body inclination angle $\beta$ as a sideward inclination angle of a vehicle body of the motorcycle during running of the motorcycle becomes greater than or equal to a predetermined angle, a change in shift position in the transmission is inhibited. The method controls the transmission for the motorcycle in order to reduce an operational load on a rider during turning of the motorcycle.

20 Claims, 7 Drawing Sheets

CONTROL METHOD FOR TRANSMISSION FOR MOTORCYCLE

CROSS-REFERENCE TO RELATED APPLICATION

The present application claims priority under 35 U.S.C. §119 to Japanese Patent Application No. 2006-035922, filed Feb. 14, 2006, the entire contents of which are hereby incorporated by reference.

BACKGROUND OF THE INVENTION

1. Field of the Invention

The present invention relates to a control method for a transmission for a motorcycle such that a shift position in the transmission is changed by driving an actuator.

2. Description of Background Art

An automatic shift mechanism for changing a shift position by driving an actuator in a transmission is generally adopted in a four-wheel vehicle, and in some case it is also adopted in a motorcycle (see Japanese Patent Laid-open No. 2002-67741).

The motorcycle disclosed in Japanese Patent Laid-open No. 2002-67741 includes an automatic transmission having a plurality of shift gear trains such that the combination of gears meshing with each other is changed by driving an actuator to thereby obtain a proper one of a plurality of shift positions. Further, the grip of a steering handle in this motorcycle is provided with an A/M selector switch for switching between an automatic mode and a manual mode and a shift switch for instructing upshift and downshift.

When the automatic mode is set by the A/M selector switch, a shift position is decided according to an operational condition of an internal combustion engine mounted on the motorcycle, and an actuator is driven under control to change the current shift position in the transmission into the shift position decided above.

On the other hand, when the manual mode is set, the actuator is driven according to an instruction from the shift switch operated by a rider, thereby upshifting or downshifting the shift position.

However, the vehicle body of a motorcycle is inclined sideward in turning. Accordingly, when the current shift position in the transmission is changed according to the operational condition of the internal combustion engine or according to the operation of the shift switch during turning of the motorcycle in the condition where a vehicle body inclination angle is large, an operational load on the rider is increased to cope with a vehicle body behavior due to fluctuations in drive torque.

SUMMARY AND OBJECTS OF THE INVENTION

It is accordingly an object of the present invention to provide a control method for a transmission for a motorcycle which can reduce an operational load on a rider during turning of the motorcycle.

In accordance with a first aspect of the present invention, there is provided a control method for a transmission for a motorcycle having a plurality of shift gear trains such that the combination of gears meshing with each other is changed by driving an actuator to change a shift position. When a vehicle body inclination angle as a sideward inclination angle of a vehicle body of the motorcycle during running of the motorcycle becomes greater than or equal to a predetermined angle, a change in shift position in the transmission is inhibited.

In accordance with a second aspect of the present invention, the actuator is driven according to a shift instruction from shift operating means operated by a rider on the motorcycle.

In accordance with a third aspect of the present invention, the actuator is driven according to a shift position decided by shift position deciding means according to at least a throttle angle, an engine rotation speed, and a vehicle speed.

In accordance with a fourth aspect of the present invention, the vehicle body inclination angle is calculated according to a vehicle speed and a steering angle.

In accordance with a fifth aspect of the present invention, the vehicle body inclination angle is detected by an inclination angle sensor.

EFFECTS OF THE INVENTION

According to the first aspect of the present invention, a change in shift position in the transmission is inhibited when the vehicle body inclination angle becomes greater than or equal to the predetermined angle. Accordingly, fluctuations in drive torque in such a running condition can be avoided to reduce an operational load on the rider.

According to the second aspect of the present invention, the actuator is driven according to a shift instruction from the shift operating means operated by the rider. Accordingly, during running in the condition where the vehicle body inclination angle is greater than or equal to the predetermined angle, a change in shift position is inhibited in spite of the shift operation performed by the rider, an operational load on the rider is reduced.

According to the third aspect of the present invention, the actuator is driven according to a shift position decided by the shift position deciding means according to at least a throttle angle, an engine rotation speed, and a vehicle speed. Accordingly, during running in the condition where the vehicle body inclination angle is greater than or equal to the predetermined angle, a change in shift position is inhibited in spite of the decision of a proper shift position made by the shift position deciding means, an operational load on the rider is reduced.

According to the fourth aspect of the present invention, the vehicle body inclination angle is calculated according to a vehicle speed and a steering angle. Accordingly, the vehicle body inclination angle can be calculated without the use of any special inclination angle sensor.

According to the fifth aspect of the present invention, the vehicle body inclination angle is detected by the inclination angle sensor. Accordingly, the vehicle body inclination angle can be directly obtained without the performance of any special computation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to FIGS. 1 to 5.

Figure 1:
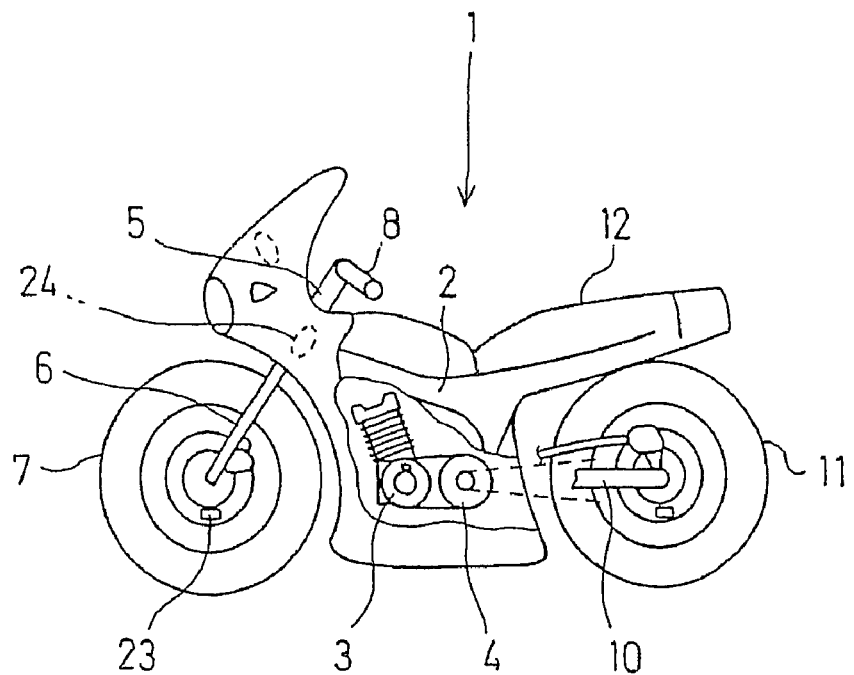
FIG. 1 is a side view of a motorcycle mounted a transmission 4 according to a first preferred embodiment of the present invention.
Figure 2:
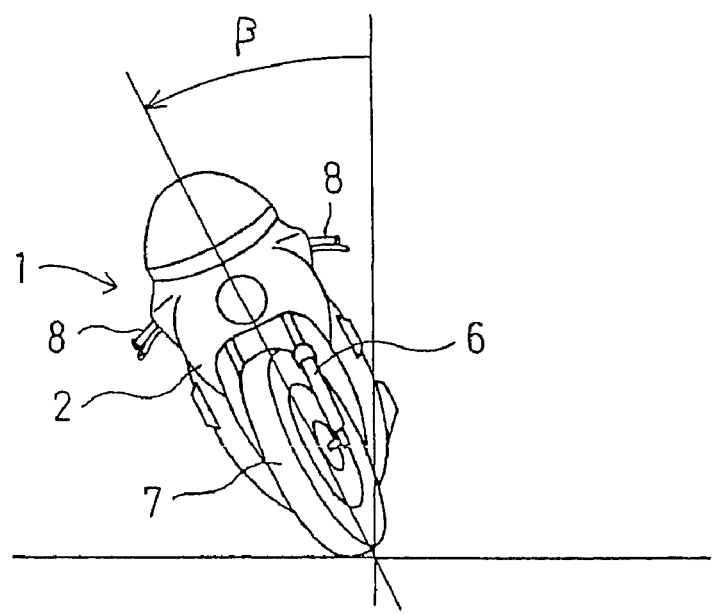
FIG. 2 is a front elevation of the motorcycle in turning.

FIG. 1 is a side view of a motorcycle 1 mounted a transmission 4 according to the preferred embodiment, and FIG. 2 is a front elevation of the motorcycle 1 in turning.

The motorcycle 1 has a vehicle body 2, and an internal combustion engine 3 is suspended at a central portion of the vehicle body 2. The transmission 4 is mounted on the rear side of the engine 3. A steering shaft 5 is supported at a front portion of the vehicle body 2 so as to extend obliquely. A front fork 6 extends downward from the steering shaft 5, and a front wheel 7 is supported to the lower ends of the front fork 6. A steering handle 8 extends laterally from the upper end of the steering shaft 5.

A rear fork 10 is supported at its front end to the vehicle body 2 at a position near a rear portion of the transmission 4 so as to extend rearward, and a rear wheel 11 is supported to the rear ends of the rear fork 10.

A chain is connected between an output shaft projecting from the transmission 4 and an axle of the rear wheel 11, thereby transmitting power from the transmission 4 to the rear wheel 11. A seat 12 for a rider is provided above the rear wheel 11.

In turning the motorcycle 1, the steering handle 8 is turned to the right or left to incline the vehicle body 2 in the direction of turn as shown in FIG. 2, thereby keeping the balance of the vehicle body 2.

As shown in FIG. 2, the angle $\beta$ of inclination of the vehicle body 2, or the vehicle body inclination angle will be hereinafter referred to as bank angle.

Although not shown in FIG. 1, a throttle sensor 21 for detecting a throttle angle $\theta$ as the opening angle of a throttle valve is mounted on a throttle body in an intake system of the internal combustion engine 3. Further, an engine rotation speed sensor 22 for detecting an engine rotation speed n is provided at an end portion of a crankshaft.

A vehicle speed sensor 23 for detecting a vehicle speed v as the rotational speed of a wheel is provided on the front wheel 7, and a steering angle sensor 24 for detecting a steering angle $\phi$ as the rotational angle of the steering shaft 5 is provided on the steering shaft 5.

The transmission 4 is a multispeed transmission having a plurality of shift gear trains such that the combination of gears meshing with each other is changed to thereby change a shift position. The change of the combination of the gears is achieved by driving a shifting motor 20. The shifting motor 20 is drive controlled by a shift control unit 30 as an electronic control unit using a computer.

The shift control unit 30 performs an automatic shifting method such that the transmission 4 is automatically shifted according to an operational condition of the internal combustion engine 3.

Figure 3:
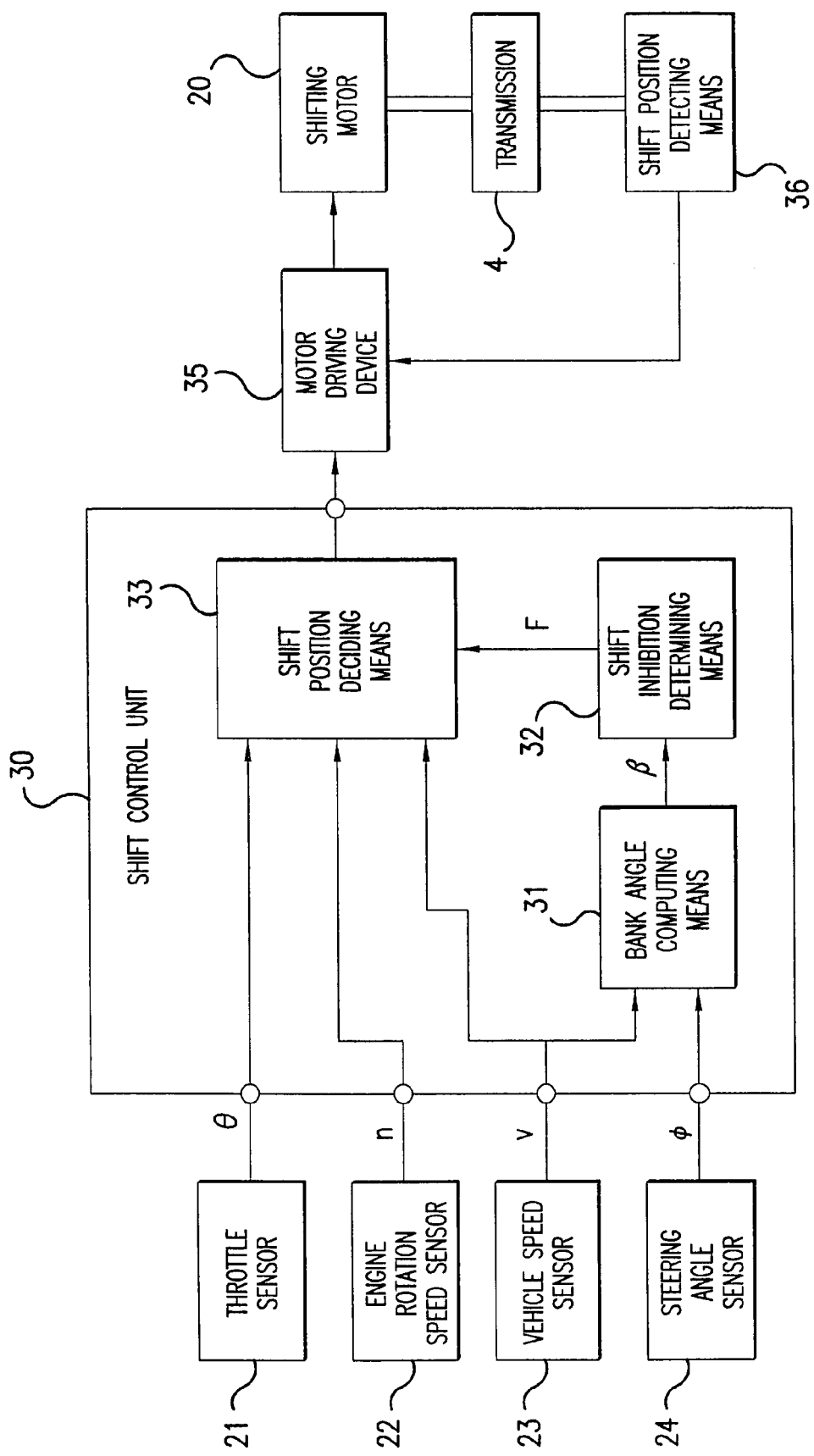
FIG. 3 is a schematic block diagram of a control system by a shift control unit according to the first preferred embodiment.

FIG. 3 is a schematic block diagram of a control system by the shift control unit 30.

The shift control unit 30 inputs the throttle angle $\theta$ detected by the throttle sensor 21, the engine rotation speed n detected by the engine rotation speed sensor 22, the vehicle speed v detected by the vehicle speed sensor 23, and the steering angle $\phi$ detected by the steering angle sensor 24. The shift control unit 30 performs computation according to these detection signals from the sensors 21 to 24 to output a drive control signal for controlling the shifting motor 20.

This control signal is output to a motor driving device 35 for driving the shifting motor 20. Thus, the shifting motor 20 is driven by the motor driving device 35 according to the control signal.

By driving the shifting motor 20, a shift drum in the transmission 4 is rotated to change the combination of the meshing gears in the shift gear trains, thereby changing the shift position.

The rotational angle of the shift drum in the transmission 4 is detected by shift position detecting means 36, and the shift position detected by the shift position detecting means 36 is fed back to the motor driving device 35, thus the shifting motor 20 is controlled by feedback controlling.

The shift control unit 30 is composed of bank angle computing means 31, shift inhibition determining means 32, and shift position deciding means 33. The bank angle computing means 31 computes the bank angle $\beta$ from the vehicle speed v and the steering angle $\phi$ detected above.

The bank angle $\beta$ may be computed by a known method (as disclosed in Japanese Patent Laid-open No. Hei 5-637, for example). The shift inhibition determining means 32 determines whether or not shifting is to be inhibited according to the bank angle $\beta$ calculated by the bank angle computing means 31.

More specifically, if the bank angle $\beta$ calculated is less than a predetermined angle B, shifting is permitted, whereas if the bank angle $\beta$ calculated is not less than the predetermined angle B, shifting is inhibited.

The shift position deciding means 33 decides a proper shift position by using a preset shift map according to the throttle angle $\theta$, the engine rotation speed n, and the vehicle speed v detected above. The shift position deciding means 33 also decides whether or not shifting is to be performed according to the result of determination by the shift inhibition determining means 32.

Figure 4:
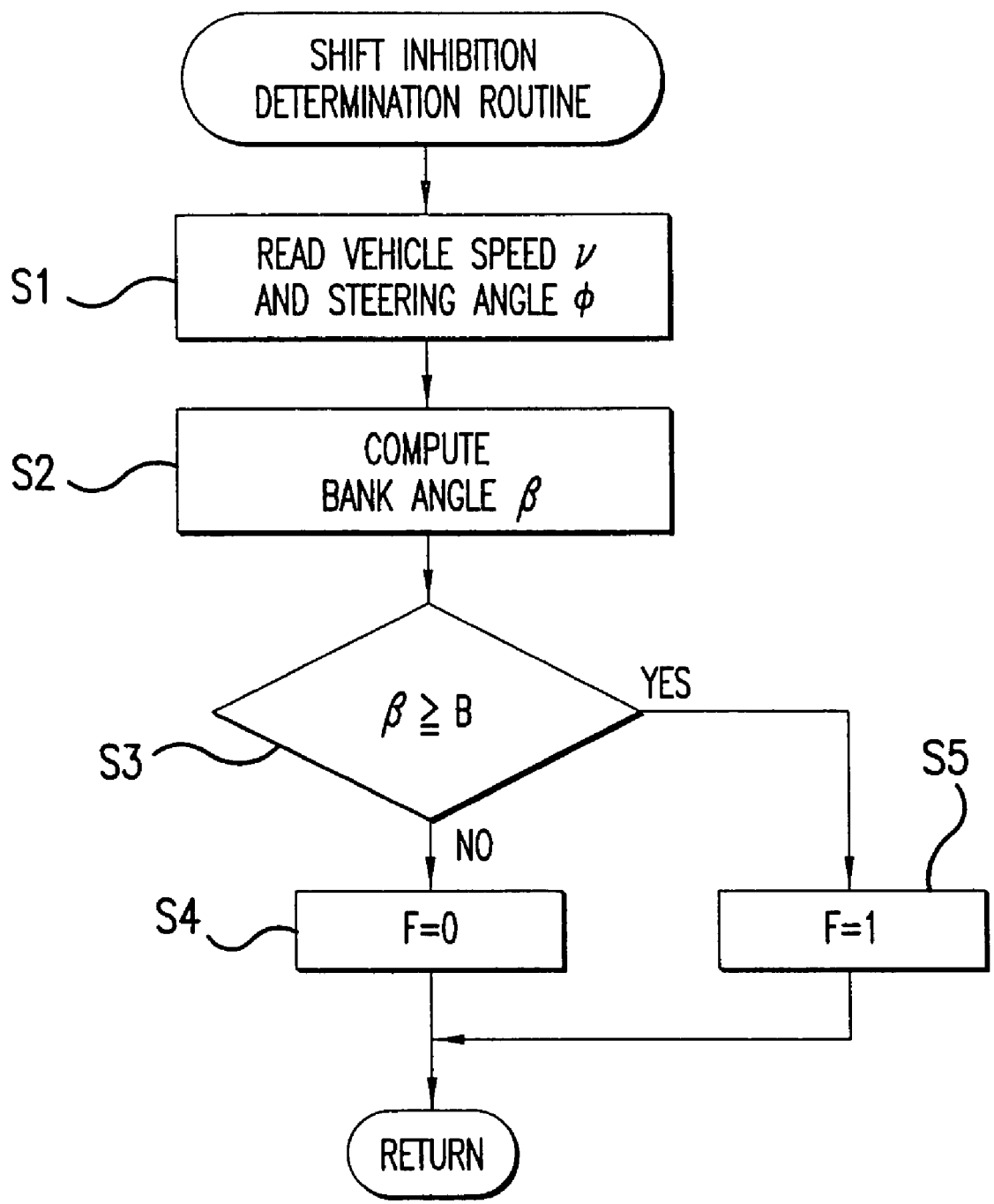
FIG. 4 is a flowchart showing a control process by shift inhibition determining means according to the first preferred embodiment.

FIG. 4 is a flowchart showing a control process by the shift inhibition determining means 32.

The vehicle speed v detected by the vehicle speed sensor 23 and the steering angle $\phi$ detected by the steering angle sensor 24 are read (step 1), and in step 2 the bank angle $\beta$ is calculated from the vehicle speed v and the steering angle $\phi$.

It is determined whether or not the bank angle β calculated above is greater than or equal to the predetermined angle B (step 3).

Figure 5:
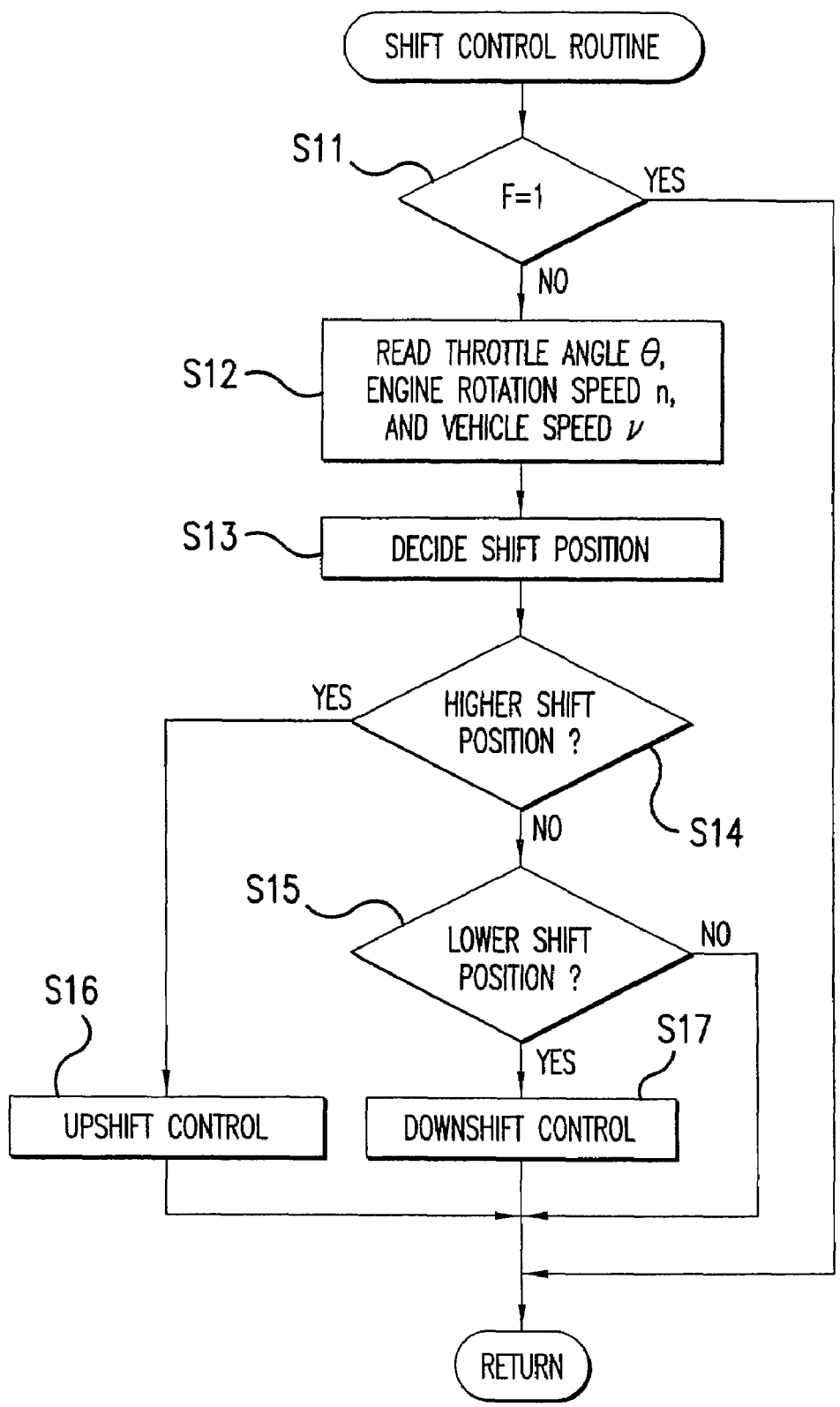
FIG. 5 is a flowchart showing a control process by shift position deciding means according to the first preferred embodiment.

If the bank angle β is less than the predetermined angle B (β<B), the program proceeds to step 4, in which a shift inhibition flag F is set to "0". Conversely, if the bank angle β is greater than or equal to the predetermined angle B (β≧B), the program proceeds to step 5, in which the shift inhibition flag F is set to "1". FIG. 5 is a flowchart showing a control process by the shift position deciding means 33. In step 11, the status of the shift inhibition flag F is determined. If the shift inhibition flag F is "0", the program proceeds to step 12, whereas if the shift inhibition flag F is "1", the program is ended, that is, the shift control is not performed.

Accordingly, when the shift inhibition flag F is "1", that is, when the bank angle β is greater than or equal to the predetermined angle B (β≧B), the current shift position is not changed, but it is maintained.

When the shift inhibition flag F is "0" and the program proceeds to step 12, the throttle angle θ, the engine rotation speed n, and the vehicle speed v detected are read and the program proceeds to step 13, in which a proper shift position is decided according to the shift map.

In step 14, it is determined whether or not the shift position decided above is higher than the current shift position. If the decided shift position is higher than the current shift position, the program jumps to step 16, in which a control signal instructing upshift is output.

If the decided shift position is not higher than the current shift position, the program proceeds from step 14 to step 15, in which it is determined whether or not the decided shift position is lower than the current shift position. If the decided shift position is lower than the current shift position, the program proceeds to step 17, in which a control signal instructing downshift is output.

If the decided shift position is not higher than the current shift position and not lower than the current shift position, that is, if the decided shift position is the same as the current shift position, the program is ended from step 15 and the current shift position is maintained.

Thus, the shift control for the transmission 4 in the motorcycle 1 is performed as mentioned above. Accordingly, during running in the condition where the bank angle β of the vehicle body 2 is less than the predetermined angle B, normal automatic shift control is performed to permit a change in shift position. However, during turning in the condition where the bank angle β is greater than or equal to the predetermined angle B, a change in shift position is inhibited to maintain the current shift position. Accordingly, fluctuations in drive torque in such a running condition can be avoided to thereby reduce an operational load on the rider.

While the bank angle β is calculated from the vehicle speed v and the steering angle φ in this preferred embodiment, the bank angle β may be directly detected by a bank angle sensor as an inclination angle sensor such as a gimbal or a gyroscope.

Another preferred embodiment of the present invention will now be described with reference to FIGS. 6 to 8.

The motorcycle according to this preferred embodiment adopts a manual shifting method such that shifting is performed according to an operational instruction by the rider. The motorcycle according to this preferred embodiment includes an upshift switch 41 and a downshift switch 42 as shift operating means for performing a shift instruction provided in the vicinity of one of the grops of the steering handle. The motorcycle further includes a bank angle sensor 43 such as a gimbal or a gyroscope for directly detecting the bank angle β.

Figure 6:
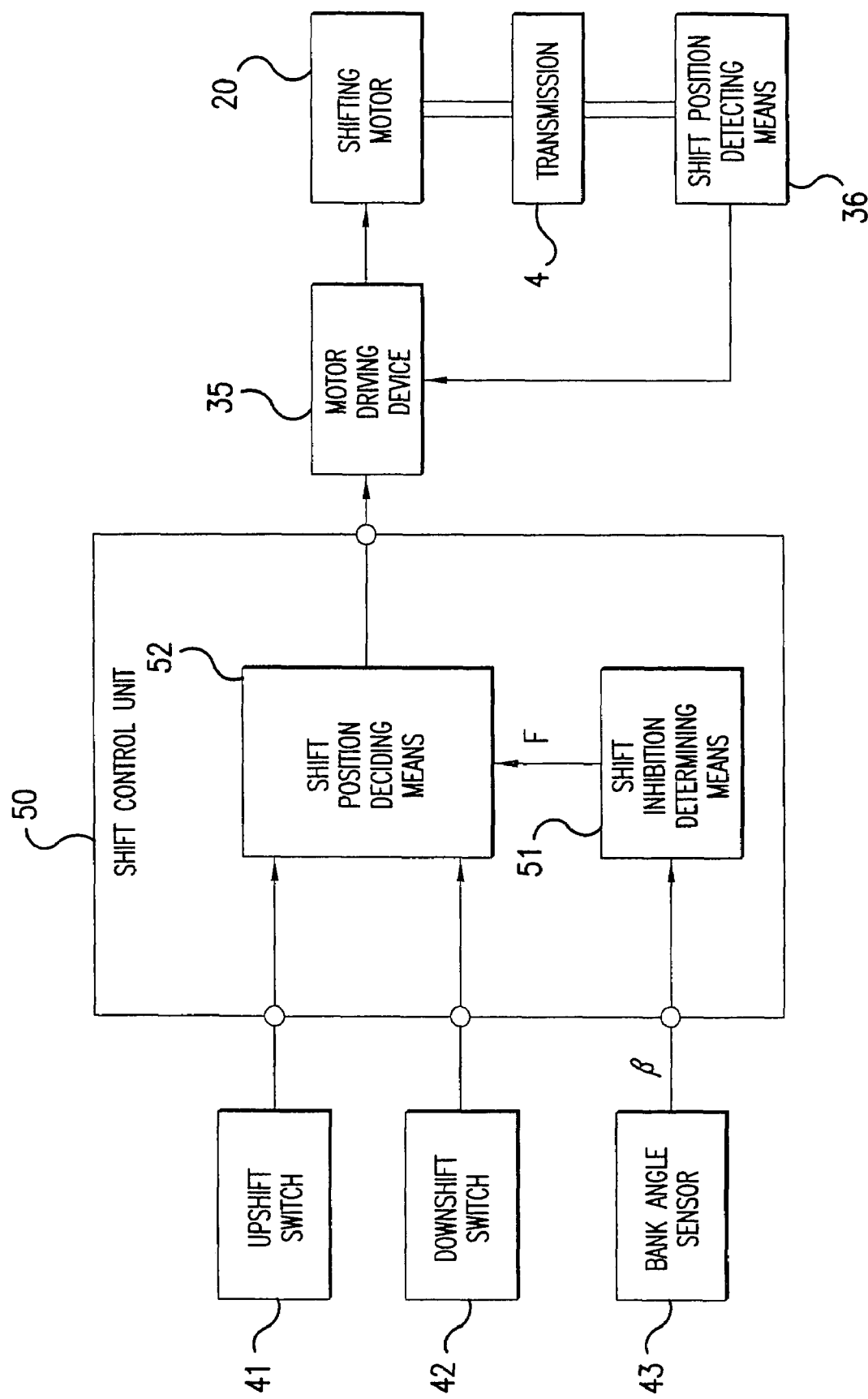
FIG. 6 is a schematic block diagram of a control system by a shift control unit according to a second preferred embodiment of the present invention.

FIG. 6 is a schematic block diagram of a control system by a shift control unit 50 included in this motorcycle.

In FIG. 6, a shifting motor 20 and a drive control system therefore are the same as those in the previous preferred embodiment, so the same parts as those shown in FIG. 3 are denoted by the same reference numerals.

The shift control unit 50 inputs on-signals from the upshift switch 41 and the downshift switch 42 and the bank angle β detected by the bank angle sensor 43. The shift control unit 50 performs computation according to these detection signals from the switches 41 and 42 and the sensor 43 to output a control signal for controlling the shifting motor 20.

The shift control unit 50 is composed of shift inhibition determining means 51 and shift position deciding means 52. The shift inhibition determining means 51 performs shift inhibition determination according to the control flowchart shown in FIG. 7.

Figure 7:
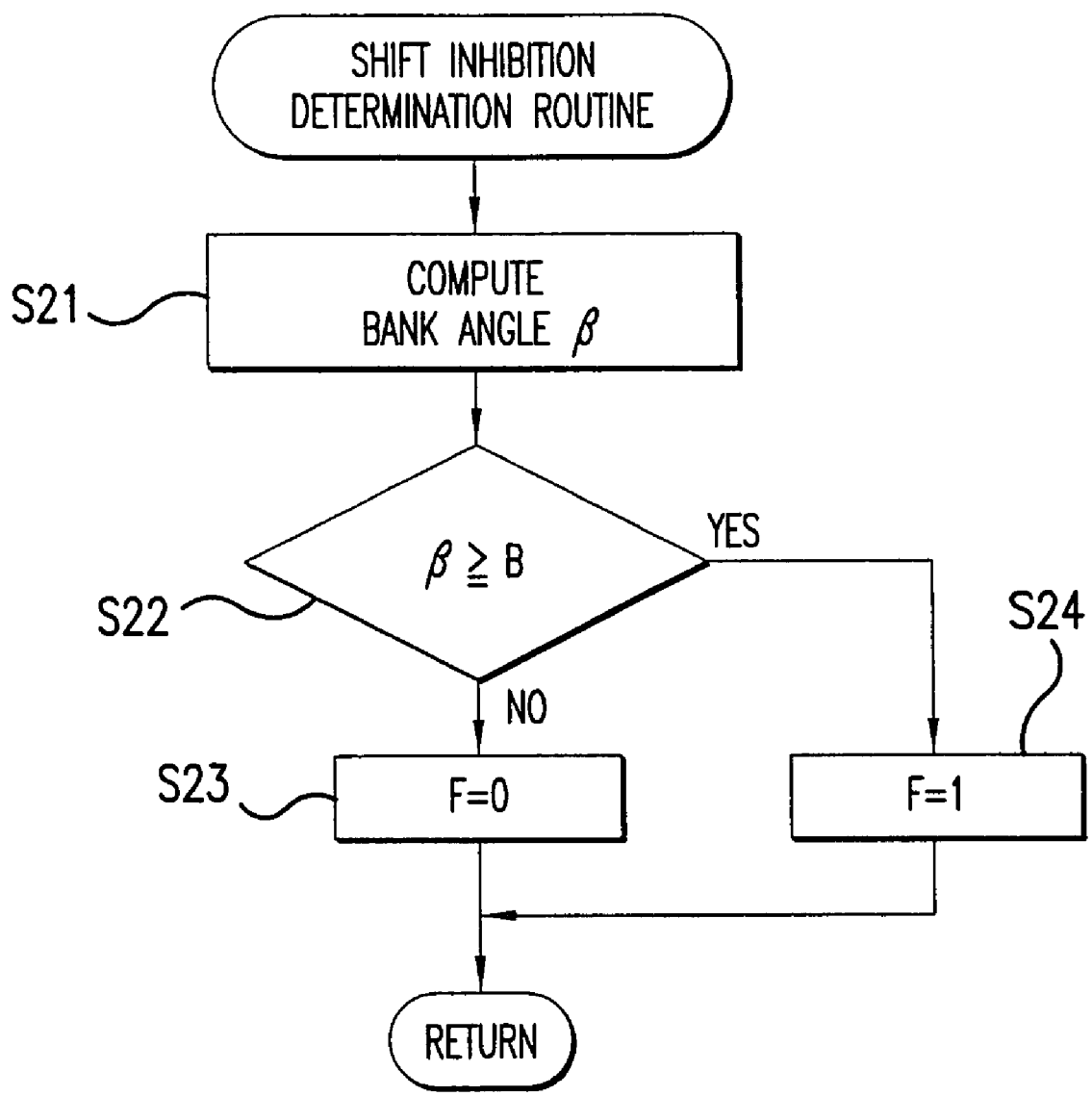
FIG. 7 is a flowchart showing a control process by shift inhibition determining means according to the second preferred embodiment.

Referring to FIG. 7, the bank angle β detected above is read (step 21), and it is determined whether or not the bank angle β detected above is greater than or equal to the predetermined angle B (step 22).

If the bank angle β is less than the predetermined angle B (β<B), the program proceeds to step 23, in which the shift inhibition flag F is set to "0". Conversely, if the bank angle β is greater than or equal to the predetermined angle B (β≧B), the program proceeds to step 24, in which the shift inhibition flag F is set to "1".

Figure 8:
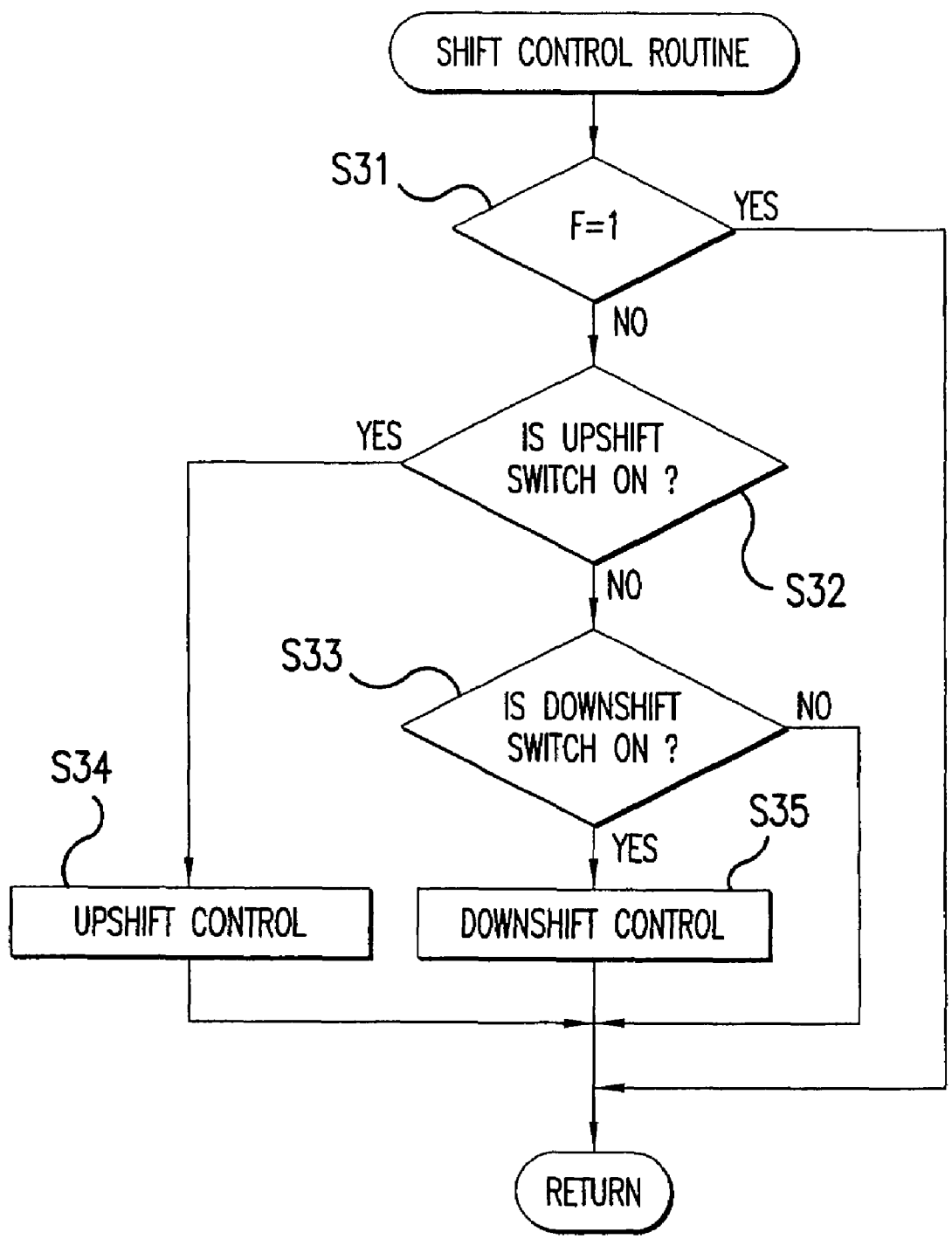
FIG. 8 is a flowchart showing a control process by shift position deciding means according to the second preferred embodiment.

The shift position deciding means 52 decides a proper shift position according to the control flowchart shown in FIG. 8 to output a control signal.

In step 31, the status of the shift inhibition flag F is determined. If the shift inhibition flag F is "0", the program proceeds to step 32, whereas if the shift inhibition flag F is "1", the program is ended, that is, the shift control is not performed.

Accordingly, when the shift inhibition flag F is "1", that is, when the bank angle β is greater than or equal to the predetermined angle B (β≧B), the current shift position is not changed, but it is maintained.

When the shift inhibition flag F is "0" and the program proceeds to step 32, it is determined whether or not the upshift switch 41 is in the on state. If the upshift switch 41 is in the on state, that is, if the upshift operation is instructed by the rider, the program jumps to step 34, in which a control signal instructing upshift is output.

If the upshift switch 41 is in the off state, the program proceeds to step 33, in which it is determined whether or not the downshift switch 42 is in the on state. If the downshift switch 42 is in the on state, that is, if the downshift operation is instructed by the rider, the program jumps to step 35, in which a control signal instructing downshift is output.

If both of the upshift switch 41 and the downshift switch 42 are in the off state, that is, if a change in shift position is not instructed by the rider, the program is ended from step 33 and the current shift position is maintained.

Thus, the shift control for the transmission according to this preferred embodiment is performed as mentioned above. Accordingly, during running in the condition where the bank angle β of the vehicle body 2 is less than the predetermined angle B, a change in shift position is performed according to the shift instruction by the rider. However, during turning in the condition where the bank angle β is greater than or equal to the predetermined angle B, a change in shift position is inhibited in spite of the shift instruction by the rider to maintain the current shift position. Accordingly, fluctuations in drive torque in such a running condition can be avoided to thereby reduce an operational load on the rider.

While the bank angle β is detected by the bank angle sensor 43 in this preferred embodiment, a vehicle speed sensor and a steering angle sensor may be provided instead as in the previous preferred embodiment to thereby calculate the bank angle β from the vehicle speed v and the steering angle φ.

Further, while the shifting method in this preferred embodiment is a manual shifting method, the shifting method may be modified to combine the manual shifting method adopted in this preferred embodiment and the automatic shifting method adopted in the previous preferred embodiment, wherein a manual mode using the manual shifting method and an automatic mode using the automatic shifting method may be switched therebetween. Also in this case, the shift inhibition control according to the bank angle β may be effected in both of the manual mode and the automatic mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control method for a transmission for a motorcycle having a plurality of shift gear trains such that a combination of gears meshing with each other is changed by driving an actuator to change a shift position, wherein
when a vehicle body inclination angle as a sideward inclination angle of a vehicle body of said motorcycle during running of said motorcycle becomes greater than or equal to a predetermined angle, a change in shift position in said transmission is inhibited.

2. The control method for a transmission for a motorcycle according to claim 1, wherein said actuator is driven according to a shift instruction from shift operating means operated by a rider on said motorcycle.

3. The control method for a transmission for a motorcycle according to claim 1, wherein said actuator is driven according to a shift position decided by shift position deciding means according to at least a throttle angle, an engine rotation speed, and a vehicle speed.

4. The control method for a transmission for a motorcycle according to claim 1, wherein said vehicle body inclination angle is calculated according to a vehicle speed and a steering angle.

5. The control method for a transmission for a motorcycle according to claim 3, wherein said vehicle body inclination angle is calculated according to a vehicle speed and a steering angle.

6. The control method for a transmission for a motorcycle according to claim 1, wherein said vehicle body inclination angle is detected by an inclination angle sensor.

7. The control method for a transmission for a motorcycle according to claim 1, wherein said vehicle body inclination angle is detected by a gimbal.

8. The control method for a transmission for a motorcycle according to claim 2, wherein the shift operating means includes an upshift switch and a downshift switch.

9. The control method for a transmission for a motorcycle according to claim 1, wherein the actuator is driven only after at least one of an upshift switch and a downshift switch has been operated by a rider on said motorcycle.

10. The control method for a transmission for a motorcycle according to claim 8, wherein the actuator is driven only after at least one of the upshift switch and the downshift switch has been operated by a rider on said motorcycle.

11. A control method for a transmission for a motorcycle having a plurality of shift gear trains such that a combination of gears meshing with each other is changed by driving a shifting motor to change a shift position, the method comprising:
determining whether of not a vehicle body inclination angle as a sideward inclination angle of a vehicle body of said motorcycle during running of said motorcycle is greater than or equal to a predetermined angle; and
preventing a change in shift position in said transmission when said vehicle body inclination angle during running is greater than or equal to the predetermined angle.

12. The control method for a transmission for a motorcycle according to claim 11, further comprising:
driving said shifting motor according to a shift instruction from shift operating means operated by a rider on said motorcycle.

13. The control method for a transmission for a motorcycle according to claim 11, further comprising:
automatically driving said shifting motor according to a shift position decided by shift position deciding means according to at least a throttle angle, an engine rotation speed, and a vehicle speed.

14. The control method for a transmission for a motorcycle according to claim 11, further comprising:
calculating said vehicle body inclination angle according to a vehicle speed and a steering angle.

15. The control method for a transmission for a motorcycle according to claim 13, further comprising:
calculating said vehicle body inclination angle according to a vehicle speed and a steering angle.

16. The control method for a transmission for a motorcycle according to claim 11, further comprising:
detecting said vehicle body inclination angle by an inclination angle sensor.

17. The control method for a transmission for a motorcycle according to claim 11, further comprising:
detecting said vehicle body inclination angle by a gyroscope.

18. The control method for a transmission for a motorcycle according to claim 12, wherein the shift operating means includes an upshift switch and a downshift switch.

19. The control method for a transmission for a motorcycle according to claim 1, further comprising:
driving the shifting motor only after at least one of an upshift switch and a downshift switch has been operated by a rider on said motorcycle.

20. The control method for a transmission for a motorcycle according to claim 18, further comprising:
driving the shifting motor only after at least one of the upshift switch and the downshift switch has been operated by a rider on said motorcycle.

* * * * *